March 3, 1964 J. E. THRAP ETAL 3,123,089
FLOW DIVIDER AND CONTROL VALVE
Original Filed July 17, 1959 2 Sheets-Sheet 2
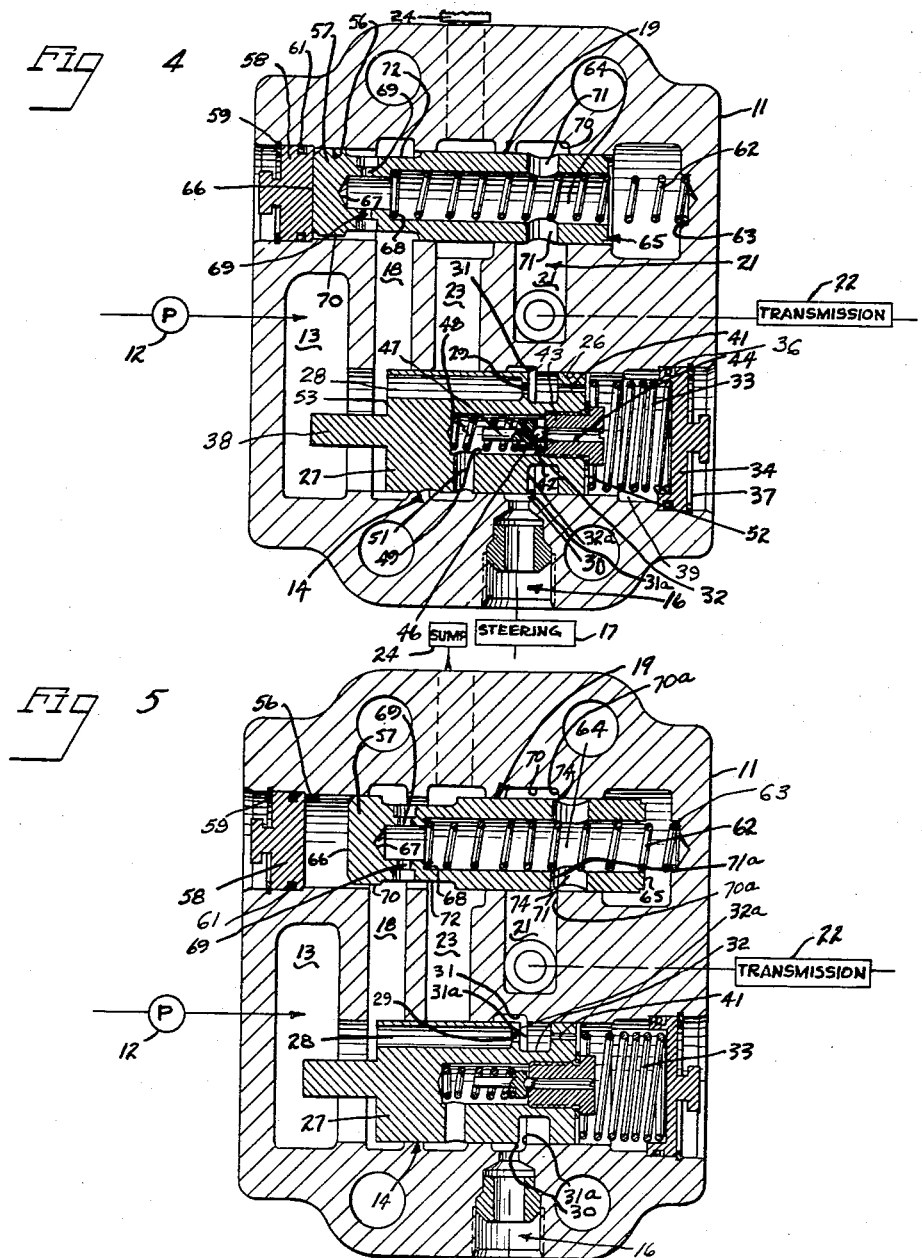
Inventors
JOHN E. THRAP
HOMER D. FARR United States Patent Office 3,123,089
Patented Mar. 3, 1964

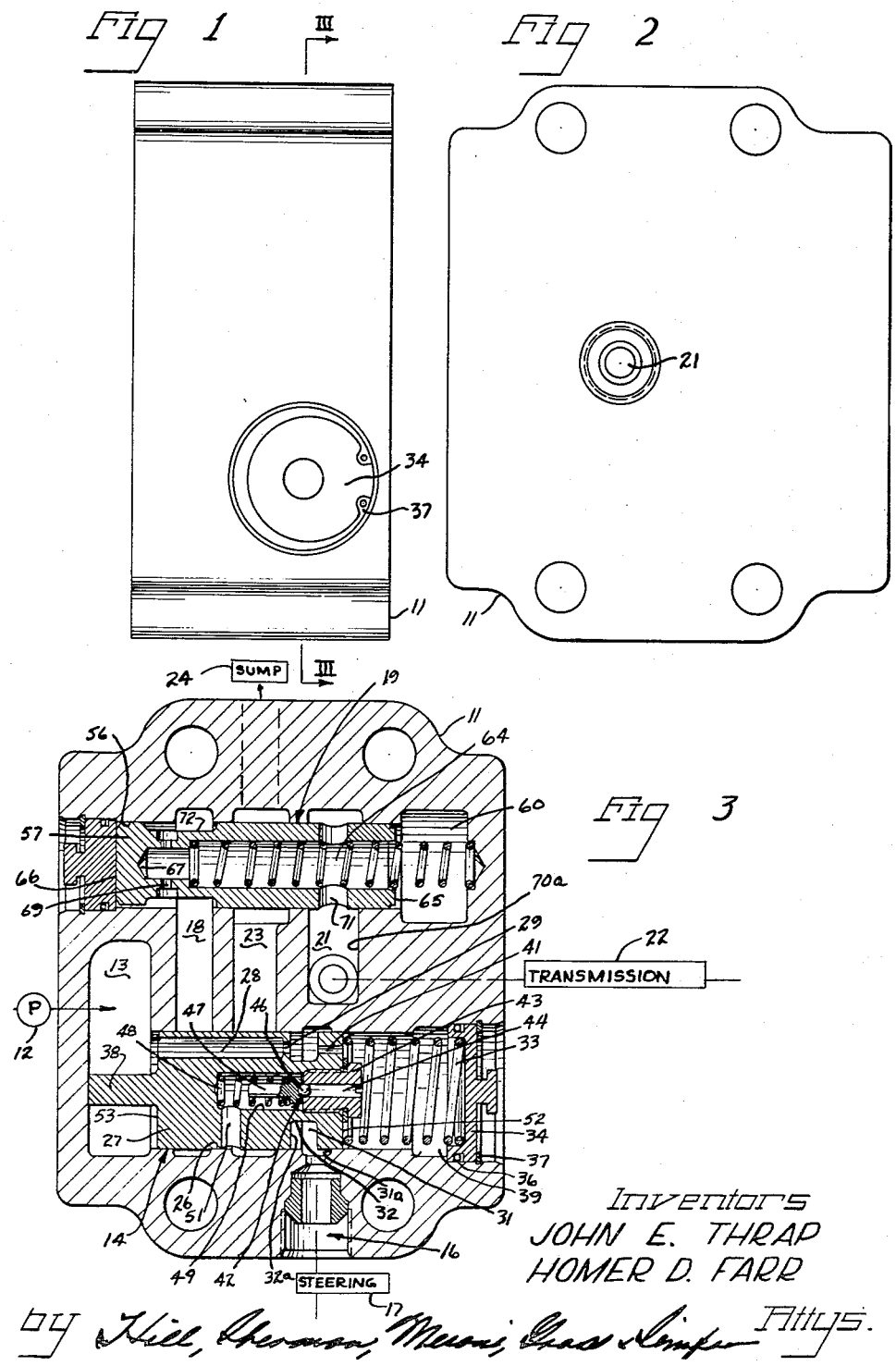

3,123,089
FLOW DIVIDER AND CONTROL VALVE
John E. Thrap, Garfield Heights, and Homer D. Farr, Brecksville, Ohio, assignors to Thompson Ramo Wooldridge Inc., Cleveland, Ohio, a corporation of Ohio
Original application July 17, 1959, Ser. No. 827,947. Divided and this application Jan. 2, 1962, Ser. No. 171,546
4 Claims. (Cl. 137—101)

The present invention relates to improvements in flow dividing control valves and particularly to a flow divider and control valve for a hydraulic supply system furnished with fluid under pressure from a delivery pump having a varying delivery pressure with said valve receiving fluid from this pump and delivering it at a constant pressure and constant flow and diverting the remainder of the fluid to other points in the system.

The present application is a division of our copending application Serial No. 827,947, filed July 17, 1959.

This invention contemplates the provision of a flow divider valve which is capable of controlling flow to two systems. In automotive vehicles and the like, different systems having fluid operated power accessories are used which require a supply of pressurized oil or other operating fluid. The oil is usually delivered by an engine driven pressure pump which may have a delivery that varies with the speed of the vehicle engine. Power operated steering mechanisms and transmissions are among the accessories requiring a supply of pressurized oil and may have different flow requirements. The present invention contemplates the provision of a supply system embodying a valve which will furnish a pressurized supply of oil to a power steering mechanism and to a power transmission which have different flow requirements.

An object of the invention is to provide an improved flow divider control valve which will supply a flow of oil under pressure to a first flow requirement such as a power steering mechanism at one pressure and at one flow requirement, and will divert oil under pressure to supply other flow requirements such as a power transmission mechanism, and will accommodate variances in supply pressure and flow.

An object of the present invention is to provide an improved oil supply system embodying an improved flow divider valve capable of operating to control and divide a flow of oil delivered under pressure from a single variable pressure supply to separate systems.

Another object is to provide a flow divider control valve of the above capabilities wherein the systems require different rates of flow.

Another object of the invention is to provide a flow divider valve wherein a self-adjusting orifice is provided to compensate for variances in supply pressures.

Another object is to provide an improved flow control valve for delivering fluid at a constant flow and constant pressure from a source having varying delivery characteristics, and having a relief means for getting rid of excessive fluid in the event of the delivery of excess fluid.

Other objects and advantages will become more apparent with the teaching of the principles of the invention as disclosed in the preferred embodiment thereof in the specification, claims and drawings, in which:

FIGURE 1 is a side elevational view of a valve housing having a valve mechanism therein, embodying the principles of the present invention;

FIGURE 2 is a front elevational view of the housing of FIGURE 1;

FIGURE 3 is a vertical sectional view taken substantially along line III—III of FIGURE 1 and showing details of the interior construction of the valve mechanism with no fluid being delivered by the pump;

FIGURE 4 is a vertical sectional view similar to FIGURE 3, but showing the valve mechanism as the power steering supply control valve moves to operative position and before the transmission valve is in full operation; and, FIGURE 5 is a vertical sectional view similar to FIGURES 3 and 4, but illustrating the valve mechanism in full operation supplying the power steering and power transmission.

As shown on the drawings:

*Overall Operation of System Embodying Control Valve*

As embodied in a vehicle such as an automobile, in a preferred arrangement, the features of the invention are illustrated in FIGURES 3, 4 and 5 as including a pump 12 driven by suitable means such as an automobile engine and connected to deliver an operating fluid, such as oil, to the valve mechanism enclosed within a valve housing 11. The pump 12 delivers to a primary supply chamber or pump passage 13, and a first or a steering valve 14, which is the control valve hereinabove referred to, controls the flow from the pump passage 13. Continuous flow is directed to a first or a steering supply passage 16 which connects to a steering mechanism 17. The valve 14 controls the flow from the pump passage 13 to the steering supply passage 16 to allow only a predetermined flow. The pump passage 13 communicates (when the plunger of the valve 14 moves to the right) with a second or a transmission supply passage 18.

A second or a transmission valve 19 controls the flow from the transmission supply passage to a transmission delivery passage 21. The transmission supply passage also communicates with a return passage 23 (when the plunger of the valve 19 moves to the right) which returns the excess oil not used by the steering and transmission devices to a sump 24.

The valve mechanism operates to serve two systems, e.g. the power steering system and the transmission system with variance in supply pressure and to satisfy and regulate flow of each system. As an example, the power steering system might require 2 g.p.m. at 700 p.s.i. and the transmission system might require 4 g.p.m. at 100 p.s.i. when the pump is supplying an adequate amount of oil under pressure, the dividing valve will function so as to adequately supply each sysem with the proper amount of oil.

*The Steering Valve or Control*

The steering or control valve 14, FIGURES 3 and 4 includes a valve chamber 26 within the housing 11. The valve chamber is cylindrical in shape, and houses a cylindrically shaped valve plunger 27. The plunger has a flow conduit or chamber 28 therein leading to a pressure drop or controlling orifice 29, which communicates with an annular valve groove 32 formed in the valve plunger and communicating with an annular chamber groove 31 in the valve chamber 26. The chamber groove 31 communicates with the steering supply passage 16. The valve groove 32 is positioned so that flow may continue from the pump passage 13 through the valve plunger 27 to the steering supply passage 16. The valve groove 32 has an annular side valve surface 32a which coacts with an annular side chamber surface 31a of the groove 31 to form an annular variable flow control secondary orifice 30 therebetween, as shown in FIGURES 4 and 5 the variable secondary orifice 30 varies as the valve plunger 27 shifts position. The plunger 27 is shown in FIGURE 3 in a first upstream position when the pump is not operating and there is no pressure upstream of the valve, and is shown in operating position in FIGURES 4 and 5, having moved toward a second or downstream position.

The valve plunger 27 is urged toward the first, or upstream position by a coil compression spring 33 positioned between the plunger 27 and a spring supporting plug 34. The plug is provided with an annular seal 36 and is locked in position by an expanding snap ring 37. Movement of the plunger 27 to first position is limited by a protuberance 38 on the end of the plug, which engages a wall of the pump passage 13. The spring 33 is located in a control pressure chamber 39 at one end of the plunger 27 and the pressure of the oil in the control pressure chamber 39 acts against a plunger first end surface 52 to urge the plunger toward first the upstream position. Oil enters the chamber 39 through a connecting orifice or port 41 in the plunger from the annular valve groove 32 of the plunger so that the pressure in the chamber 39 is the same as in the groove 31.

A relief valve 42 permits the escape of oil from the control chamber 39 at a predetermined maximum pressure, and the relief valve includes a plug 43 having a flow passage 44 therein terminating in a valve seat against which seats a ball relief valve 46 held in place by a ball support 47 backed by a spring 48. The spring 48 and plug 43 are located in a bore 49 extending part way through the valve plunger 27, and oil flows through the bore 49 and out through a lateral bore 51 which communicates with the return passage 23 in the valve housing 11.

The pressures affecting the control position of the valve plunger 27, and therefore the size of the control orifice 30, act on the first end surface 52 exposed to the control chamber 39 to urge the plunger to the first position, and on a second end surface 53 of the plunger exposed to the oil pressure in the pump passage 13 to urge it toward the second position. Flow from the pump passageway 13 through the controlling orifice 29 creates a reduced pressure in the steering passage 16 and hence a pressure differential across the plunger 27.

The controlling orifice 29 and the secondary orifice 30 will operate to allow only a predetermined flow to the steering mechanism 17. When the pump delivery pressure increases to cause an increased pressure in the pump passage 13, the flow through the orifice 29 tries to increase. This causes an increased pressure drop across the orifice and a consequent increased pressure differential acting on the first surface 52 and the second surface 53. Due to this pressure drop, the valve plunger 27 moves downstream toward second position to choke off the flow to the steering system. The valve plunger 27 will automatically assume a position wherein the upstream pressure on the second surface 53 is equal to the force of the downstream pressure in the chamber 39 on the valve plunger surface 52 plus the force of the spring 33. This position of equilibrium will be reached with the correct flow through the orifice 29 and the secondary orifice 30 will pass the same flow to the steering mechanism 17. Thus the valve 14 will automatically compensate for variations in upstream pressure and will continue to supply the steering mechanism with proper flow. The excess fluid will be directed to the transmission supply passage 18 and the second valve 19 will divide the flow to furnish fluid to the transmission mechanism at its proper flow and the excess fluid will be returned to the sump.

*The Transmission Valve*

The above described control valve may of course be employed in various systems, but is particularly well adjusted to use in a system as above described and with a transmission valve such as shown; therefore, a detailed description of the transmission valve will be appropriate.

The transmission valve 19 includes a substantially cylindrical bore 56 in the housing 11 slidably containing a transmission valve plunger 57. The bore is closed by a plug 58 locked in place by an expanding spring ring 59 and sealed by an annular gasket 61.

The valve plunger 57 has a coil compression spring 62 which seats on a surface 63 in a control chamber 60 at one end of the cylindrical bore 56. The spring extends up into a flow chamber 64 bored into one end of the valve plunger and seats against a shoulder 68 in the flow chamber. The shoulder 68, with an annular end surface 65, and a surface 67 at the base of the flow chamber, constitutes a first or downstream surface which is exposed to the pressure of the oil in the control chamber 60 and flow chamber 64 to coact with the spring 62 to urge the valve toward a first or upstream position in which the plunger 57 is positioned in FIGURE 4, prior to its moving to its operative position in FIGURE 5. The valve plunger has at the other end a second or upstream surface 66 which is exposed to the pressure of the oil in the transmission passage 18 to urge the plunger toward a second or downstream position, as illustrated in FIGURE 5. The plunger 57 is cut away at 70 to permit the oil to have access to the second surface 66. A pressure differential exists across said first and said second surfaces of the plunger by virtue of pressure drop or controlling orifices 69 extending radially through the plunger and communicating between the flow chamber 64 within the plunger and the transmission passage 18. Oil flows out of the flow chamber through radial ports 71 in the plunger into the transmission delivery passage 21. The radial ports open into a groove 70 having a side surface 70a which coacts with the front edges or surfaces 71a of the ports 71 to form variable secondary orifices 74, as shown in FIGURE 5.

The flow required by the transmission mechanism is satisfied by design of the size of the pressure drop orifices 69 and the size of the spring 62. These characteristics will of course differ from the characteristics of the orifice 29, and the spring 33 of the steering valve, if the requirements differ, as will be appreciated by those skilled in the art.

When the pump is supplying an adequate amount of oil under pressure for the steering mechanism and for the transmission, so that the steering valve plunger 27 moves to the operative position as shown in FIGURES 4 and 5, the plunger 57 of the transmission valve will move to the operative position as illustrated in FIGURE 5. In this position the transmission mechanism 22 will be supplied oil at the required pressure and the excess oil will be directed from the transmission supply passage to the return passage 23 via a reduced portion 72 in the valve plunger.

The plunger will maintain a position to supply oil to the transmission at the correct flow and when the upstream pressure increases due to increase in pump output, the flow through the controlling orifices 69 tries to increase. This causes an increased pressure drop across the orifices 69. Due to this pressure drop, the pressure differential across the plunger 57 increases to move the plunger downstream toward the second position so as to choke off the flow to the transmission delivery passage 21 by the closing of the variable orifice 74. When the pressures acting in opposition on the plunger 57 reach equilibrium, flow will be supplied to the transmission delivery passage 21 at the proper rate independent of the variance in the upstream pressure.

As a summary of overall operation, oil is supplied to the valve assembly by the pump 12 to the pump passage 13 and will flow through the control orifice 29 of the steering valve plunger 27, and the pressure differential across the valve plunger will vary the size of the secondary orifice 30 and flow through orifices 29 and 30 will remain constant and oil will be delivered at the proper flow rate to the steering mechanism 17. Oil flows to the transmission mechanism through the transmission supply passage 18 and through the control orifices 69 in the transmission valve plunger 57. The pressure differential across the orifices 69 moves the valve plunger 57 to vary the size of the secondary control orifice 74 and flow through orifices 69 and 74 will remain constant to supply oil to the transmission delivery passage 21 at the proper flow rate. The excess oil flows through the groove 72 in the transmission valve plunger 57 to the passage 23 back to the sump. The pump 12 may be connected to the sump for a closed system.

Thus, it will be seen that we have provided an improved oil supply system and flow divider valve which meets the objectives and advantages hereinabove set forth. The mechanism provides an improved reliable and simplified valve construction for handling the output of a single variable delivery pump and supplying the needs of a steering mechanism and a transmission.

The drawings and specification present a detailed disclosure of the preferred embodiments of the invention, and it is to be understood that the invention is not limited to the specific forms disclosed, but covers all modifications, changes and alternative constructions and method falling within the scope of the principles taught by the invention.

We claim as our invention:

1. A fluid supply system having a variable supply for providing pressurized fluid for operating a power steering mechanism and supplying a transmission comprising in combination a pump passage for supplying pressurized fluid from a pump, a steering supply passage for supplying fluid to a steering mechanism, a transmission supply passage for delivering fluid to a transmission, a valve chamber communicating with said passages, a valve plunger in said chamber movable between a first position wherein communication is blocked between said pump passage and said transmission supply passage and a second position wherein communication is afforded between said pump passage and said transmission supply passage, a first surface on said valve plunger exposed to a valve control chamber formed at one end of said valve chamber, a second surface on said valve plunger exposed to said pump passage, a plunger passage formed through said valve plunger communicating between said pump passage and said steering supply passage, a pressure drop control orifice in said plunger passage, a connecting port in said plunger communicating with said plunger passage downstream of said first orifice and communicating with said valve control chamber a secondary variable orifice controlled by said plunger and positioned downstream of said control orifice, spring means biasing said plunger to said first position, and a spring loaded pressure relief valve carried in said plunger communicating with said control chamber and capable of being opened at a predetermined maximum pressure to relieve said control chamber and cause said plunger to move to said second position.

2. A flow divider valve comprising a primary chamber for pressurized fluid, a first passage, a valve chamber communicating with said primary chamber and said first passage, a valve plunger in said chamber movable to control flow through a variable valve orifice from the primary chamber to the first passage, a first surface on said valve plunger exposed to a valve control chamber formed at one end of said valve chamber with the pressure in the chamber urging the plunger in an upstream direction, a second surface on said valve plunger exposed to said primary chamber urging the plunger in a downstream direction, a plunger passage formed through said valve plunger communicating between said primary chamber and said first passage, a pressure drop orifice in said plunger passage upstream of said variable orifice, a communicating orifice in said plunger communicating with said plunger passage downstream of said pressure drop orifice and upstream of said variable orifice and communicating with said valve control chamber, spring means biasing said plunger in an upstream direction, and a spring loaded pressure relief valve carried in said plunger communicating with said control chamber and capable of being opened at a predetermined maximum pressure to relieve said control chamber and cause said plunger to move in a downstream direction.

3. A control valve comprising a valve housing having a flow passage with an inlet and an outlet, a valve plunger slidable in a chamber in the housing between said inlet and outlet, said plunger having a first end surface exposed to inlet pressure and an opposite second end surface exposed to pressure in a control chamber formed in the housing at the end of the plunger, a valve chamber formed by an annular groove around the valve plunger, a pressure drop orifice in said plunger communicating said inlet with said valve chamber, a passage in said plunger communicating said valve chamber with said control chamber, a variable orifice formed between a surface on the valve plunger at the edge of the valve chamber and said outlet controlled by movement of said valve plunger and communicating with said valve chamber and tending to decrease in size with increase in inlet pressure and tending to increase with decrease in inlet pressure, spring means in said control chamber biasing said plunger against said inlet pressure, and a relief valve communicating with said control chamber and opening at excess pressures.

4. A control valve comprising a valve housing having a flow passage with an inlet and an outlet, a valve plunger slidable in a chamber in the housing between said inlet and outlet, said plunger having a first surface exposed to inlet pressure and a second opposing surface exposed to pressure in a control chamber in the housing, a valve chamber in said plunger, a pressure drop orifice communicating said inlet with said valve chamber, a fixed orifice communicating between said valve chamber and said control chamber, a variable orifice controlled by movement of said valve plunger and communicating with said valve chamber and tending to decrease in size with increase of inlet pressure and tending to increase with decrease in inlet pressure, so that pressure in said valve chamber and in said control chamber will change, biasing means urging said plunger against said inlet pressure, and an excess pressure relief valve connected to said control chamber.

References Cited in the file of this patent

UNITED STATES PATENTS

| 2,737,196 | Eames | Mar. 6, 1956 |
| 2,755,741 | Erskine | July 24, 1956 |

FOREIGN PATENTS

| 589,095 | Great Britain | June 11, 1947 |